Jan. 19, 1937.  S. N. MEAD  2,068,189
ELECTRIC MOTOR AND THE LIKE CONSTRUCTION
Filed March 13, 1936   3 Sheets-Sheet 1
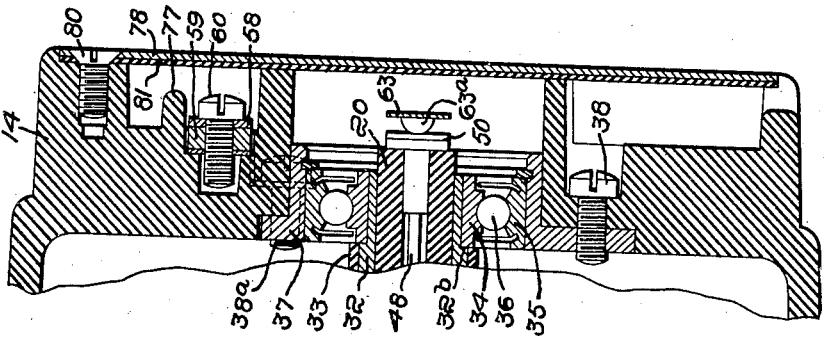
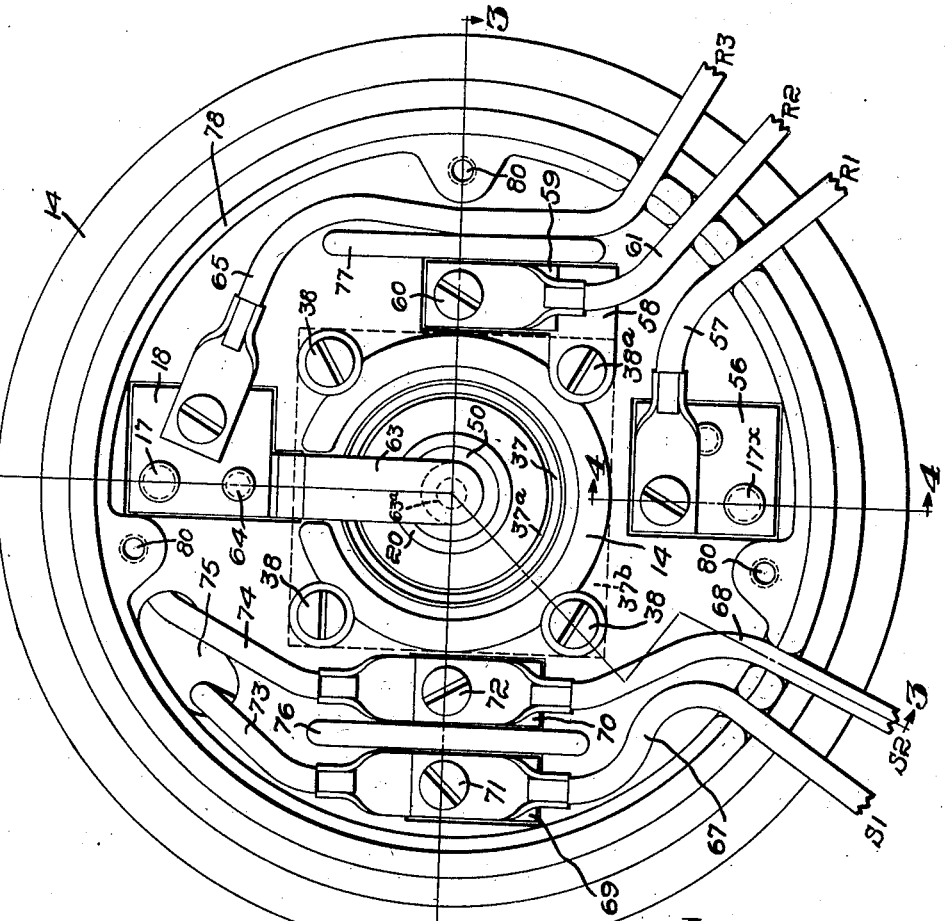
Inventor:
Samuel N. Mead,
by Emery, Booth, Townsend, Millis and Weidner
Attys

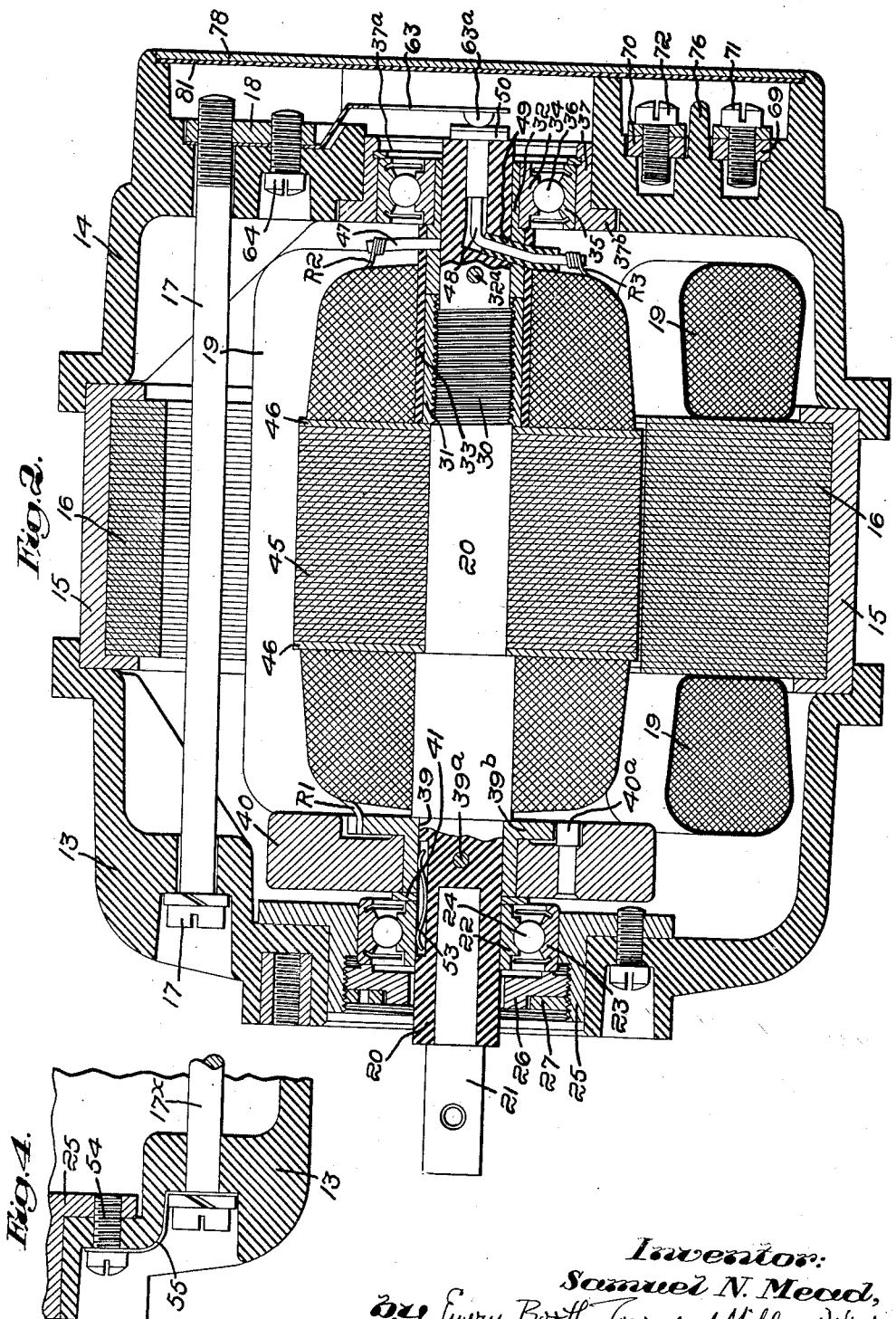

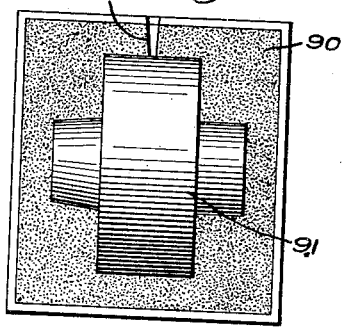
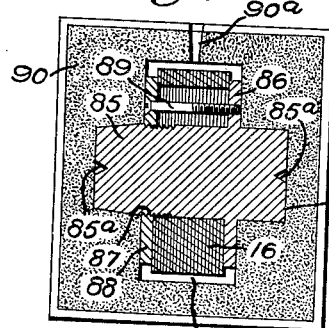
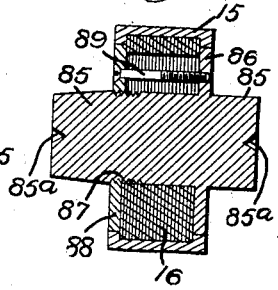
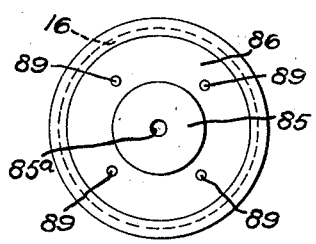
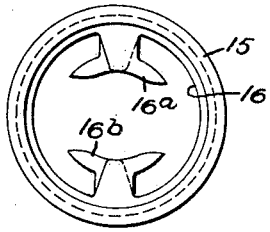
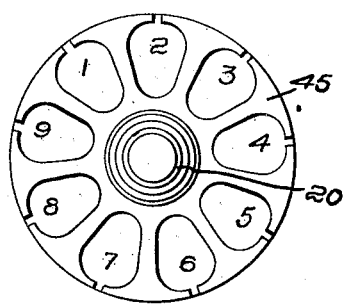
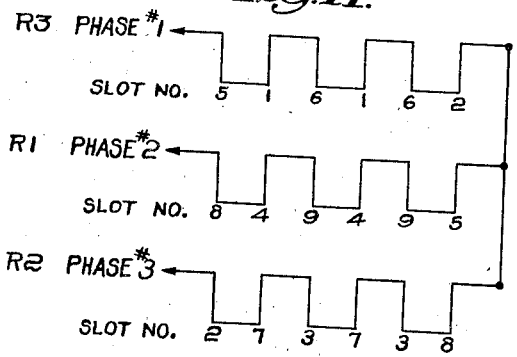
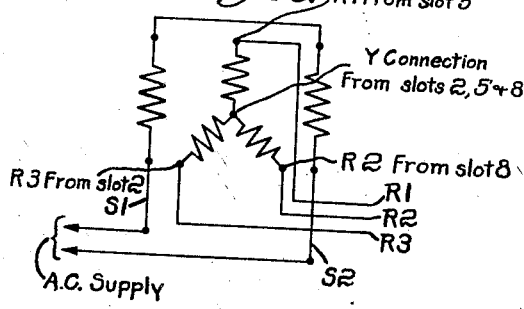

Patented Jan. 19, 1937

2,068,189

UNITED STATES PATENT OFFICE 2,068,189

ELECTRIC MOTOR AND THE LIKE CONSTRUCTION

Samuel N. Mead, Amesbury, Mass., assignor to Chas. J. Henschel & Co., Inc., Amesbury, Mass., a corporation of New York Application March 13, 1936, Serial No. 68,677

6 Claims. (Cl. 172—36)

My present invention relates to the art of electric motors and the like and more particularly aims to provide a simplified and efficient construction, with especial reference to the reduction of friction and of sparking effects in the rotor circuit or circuits, together with certain novel methods of and means for producing such construction.

In the drawings illustrating by way of example one embodiment of a motor in accordance with the invention, and showing means for practicing the method thereof, Fig. 1 is a rear end elevation of said motor;

Fig. 2 is a longitudinal section on the line 2—2 of Fig. 1;

Fig. 3 is a section of the rear end of the motor taken on the line 3—3 of Fig. 1;

Fig. 4 is a section showing a portion of the front end of the motor, on the line 4—4 of Fig. 1;

Figs. 5 to 9 illustrate steps and apparatus employed in the manufacture of the stator lamination assembly, wherein Fig. 5 shows a core and mold for the stator assembly, Fig. 6 shows the stator laminations and holding means in position in a mold in readiness for casting the shell therefor, Figs. 7 and 8 are a longitudinal sectional and an end view of the stator assembly and holding means as removed from the mold, and Fig. 9 shows the completed unit in readiness for assemblying into a motor;

Figs. 10 and 11 are diagrammatic views illustrating the rotor windings and connections; and Fig. 12 is an elementary wiring diagram of the motor circuits.

The motor as herein illustrated by way of example is of the so-called self-synchronous or synchronizing type and may be defined briefly as generally similar electrically to a three-phase alternator having a stationary two-pole field wound for connection to a single-phase alternating current source of excitation. It will be apparent, however, that various features of the invention are applicable to plural-phase and other motor and dynamo-electric constructions in general.

Referring now to Figs. 1 and 2, the motor housing comprises a front end frame 13 and a generally similar but oppositely facing rear end frame 14. These frame members are formed of a suitable non-conducting composition or other material, such as a phenol condensation product. The end frames are spaced by engagement at their inner portions with the retaining ring or shell 15 for the stator laminations 16, and are held together by the longitudinal connecting studs 17. The headed ends of the studs are received in appropriate recesses in the front end frame 13, their rear threaded ends being received in a convenient stationary part at the rear of the motor, in this instance, the terminal pads 18 and 56, Fig. 1, the pad 18 also being seen in section at the upper right in Fig. 2.

The magnetic element of the field or stator assembly, shown separately in Fig. 9, comprises the multiplicity of laminations 16 held together by the shell 15 referred to. These laminations are desirably formed of high grade silicon transformer iron and have two polar salients 16$^a$, 16$^b$, Fig. 9, alternate laminations preferably being staggered in the manner illustrated in said figure. The stator winding, indicated at 19 in Fig. 2, is similar to the field of a direct current motor or alternator.

In accordance with one feature of the invention the rotor shaft 20, or at least its portions adjacent the bearings, is formed of non-conducting material, for example, a composition such as generally comprehended under the heading of phenol condensation products. This shaft has an extension 21 for connection to other parts, and is rotatably supported at its front end in a ball bearing unit comprising inner and outer races 22, 23 and the interposed series of balls 24, the inner race 22 being received directly upon the shaft. The bearing unit is held in a bearing bushing 25 which is internally threaded for the reception of a bearing nut 26 and lock nut 27. The bearing bushing is supported directly in a correspondingly formed central aperture in the front end frame 13, and is secured to the latter as by screws, one of which is seen at 28 at the lower left portion of Fig. 2.

At its rear portion the rotor shaft 20 is provided with a threaded section 30 receiving a brass or other collar 31 the outer end of which abuts a brass or other metal sleeve 32 fixed on the non-threaded outer portion of the shaft, as by the pin 32$^a$. A fibre insulating sleeve 33 surrounds the metal collar 31 and sleeve 32. The latter has a shoulder 32$^b$ (Fig. 3) abutting the inner race 34 of the ball bearing unit for the rear end of the shaft. This bearing unit is generally similar to that at the front of the motor and comprises in addition to the inner race 34 received on the sleeve 32 an outer race 35 and interposed series of balls 36. It is held in a bearing bushing 37 provided with a retaining snap ring 37$^a$ for the bearing. The bushing includes a hub portion supported in a corresponding central aperture in the rear end frame 14, and an inner squared flange portion 37$^b$ fastened to the non-conducting end frame as by screws 38 in this instance four in number, as seen in Fig. 1. One of said screws appears in full line at the lower portion of Fig. 3 and a second one is indicated in dotted lines in the upper part of said Fig. 3, this latter screw being given the separate reference character 38$^a$ to identify it in connection with one of the rotor circuits to be described.

The motor herein illustrated by way of example is more particularly adapted to serve as the receiver or follower motor of a pair of synchronizing motors and accordingly is shown as equipped with dampening means, herein comprising the dampener collar 39 of brass or other conducting material, Fig. 2, fixed on the shaft as by means of the pin 39$^a$. The dampener collar 39 supports a magnetic dampener disc 40 secured against the flange portion 39$^b$ of the dampener collar as by means of one or more pins 40$^a$. A washer 41 may be provided between the dampening members 39, 40 and the front ball bearing means 22—24.

From the foregoing it will be noted that each of the ball bearing units 22—24 and 34—36 is electrically insulated with respect to associated main parts including particularly the non-conducting rotor shaft and the non-conducting end frames. The construction and arrangement, in accordance with the invention, accordingly is such that the ball bearings themselves are adapted to constitute elements in one or more of the rotor circuits and to afford the means through which electrical contact with one or more rotor coils is effected, as will be apparent from the later description.

The rotor assembly, which is built up on the dielectric shaft 20, comprises a laminated multi-slotted magnetic circuit including a multiplicity of laminations 45, preferably of high grade silicon transformer iron. These laminations are concentrically supported on an intermediate portion of the rotor shaft 20 and, as seen in the partly diagrammatic end view, Fig. 10, are in this instance provided with nine slots. The laminations desirably are skewed in one or the other direction, herein the left hand, through a pitch of one slot, with reference to the opposite end laminations of the group. One or more layers of insulating paper or other material may be disposed in the slots, the paper being folded over the top of the windings and secured in place. The rotor lamination assembly 45 desirably includes end insulating laminations 46, 46.

The rotor winding, in the illustrated example, is in general similar to a two-pole, three-phase, two-layer, lap one circuit, Y-connected induction motor or alternator winding. The rotor winding arrangement, as here shown by way of example, is represented diagrammatically in Fig. 11. Referring to said figure, the phase #1 winding included in the rotor circuit hereafter referred to as R$^3$ is located in slots numbers 5, 1, 6, 1, 6, 2 in the order named, and having reference to the diagram of Fig. 10. The phase #2 winding, for rotor circuit R$^1$, occupies slots numbers 8, 4, 9, 4, 9, 5 in that order, while the phase #3 winding, for rotor circuit R$^2$, is laid in slots numbers 2, 7, 3, 7, 3, 8 in their order of naming. The Y-connection for one of the ends of each coil is made by connecting together the coil ends from slots 2, 5 and 8, as seen in Fig. 11 and also in the elementary diagram of Fig. 12. The rotor windings, of which there are three in the illustrated example, are represented by the double cross-hatched portions in Fig. 2 surrounding the rotor shaft at the opposite sides of the rotor lamination assembly. Both the rotor and the stator windings desirably are vacuum impregnated with insulating varnish to seal clearances and render them moisture-proof.

Referring to Fig. 2, the lead-out connections for the other ends of the rotor coils are made as follows: The lead-out wire for phase #2, coming from slot 5, is soldered to the dampener collar 39, as indicated at R$^1$ at the left in Fig. 2; the phase #3 lead-out wire, from slot 8, indicated at R$^2$ at the right in Fig. 2, above the shaft, is soldered to a connecting post 47 extending through the insulating sleeve 33 and into the brass sleeve 32 on the rotor shaft, said sleeve being in electrical contact with the inner race 34 of the adjacent ball bearing unit; the phase #1 lead-out wire, from slot 2, indicated at R$^2$, at the right in Fig. 2, below the shaft, is soldered to a connecting member 48 extending through insulation 49 into the center of the rotor shaft 20, through the fibre sleeve 33 and the brass sleeve 32. As best seen in Fig. 2, the rear end of the rotor shaft is drilled centrally to receive a contact button 50 to which said connecting member is electrically connected.

I will now describe the portions of the rotor circuits external of the coils themselves, taking them in the order R$^1$, R$^2$, R$^3$.

As already noted, the R$^1$ circuit lead-out is connected to the dampener collar 39. Thence the circuit is through a contact spring 53 set in a longitudinal peripheral recess in the non-conducting rotor shaft 20. The inner end of the spring makes contact with the inner face of the hub portion of the dampener collar 39, while its outer end contacts the inner surface of the inner race 22 of the adjacent ball bearing unit. From the inner race the circuit is directly through the balls 24 themselves onto the outer race 23 of the bearing assembly. Thus it will be seen that the novel construction in accordance with the invention completely avoids the use of brushes and takes advantage of the ball bearing itself for establishing continuous electrical contact with one of the rotor windings, this in turn being made possible by the use of non-conducting material for the rotor shaft itself, or at least for those portions of the shaft which adjoin the ball bearing unit, and also for the end frames.

This R$^1$ circuit continues from the outer race 23 onto the surrounding metal bearing bushing 25, which is itself held in an insulated manner by the non-conducting end frame 13. It is desirable, particularly for the sake of convenience, that the lead terminals for all circuits be located at one end of the motor, in this instance the rear end. Hence it is required to carry the R$^1$ circuit under consideration across from the front to the rear end of the motor. In the illustrated embodiment this is accomplished through the medium of one of the longitudinal connecting studs 17. The particular stud 17$^×$ here used for the purpose is not the one seen at the top in Fig. 2, but that at a lower portion of the motor, and seen in part in Fig. 4. Referring to said figure, the R$^1$ circuit from the bearing bushing 25 is through a screw 54 set in an appropriate recess in the end frame 13 and taking into the flange portion of said bushing. A connecting clip 55 electrically joins the screw with the stud 17$^×$ through which the circuit continues onto a terminal pad 56 into which the rear end of the stud is threaded, as seen at the central bottom portion of Fig. 1. The terminal for the external lead 57 for the R¹ rotor circuit is screwed to said pad.

Turning now to the R² rotor circuit, this latter, in the illustrated example, also takes advantage of a ball bearing unit, that at the rear of the motor, at the right in Fig. 2, for making electrical connection with the external lead and to avoid the use of brushes. This R² circuit as previously noted is through the post 47 and the metal sleeve 32, onto the inner race 34 of the ball bearing unit, whence it continues through the balls 36 themselves, onto the outer race 35, and hence onto the conducting bearing bushing 37.

From the bearing bushing 37 this R² circuit continues through the screw 38ᵃ of the group of bushing anchoring screws 38, the heads of which are seen in Fig. 1. One of these screws 38, that at the lower left in Fig. 1, is seen in full line at the lower portion of Fig. 3. In said Fig. 3 the similar screw 38ᵃ selected for use in the R² circuit is indicated in dotted line above the rotor shaft. It is connected by means of a clip 58, see also Fig. 1, to a terminal pad 59 held in place by a screw 60 taking into the non-conducting end frame 14 and serving also to anchor the terminal for the external lead 61 for the R² circuit.

The remaining rotor circuit, R³, leads from the R³ rotor coil through the insulation 49 and internally of the non-conducting motor shaft 20, onto the central contact button 50 at the rear end face of the shaft, as already described. As seen in end elevation in Fig. 1 and in section in Fig. 2, this R³ circuit is continued from the end contact button 50 through a contact spring 63, the inner end of which carries a contact point 63ᵃ bearing at the center of the rotor shaft. The outer end of the contact spring is anchored beneath the terminal pad 18 previously mentioned, seen at the upper right corner of Fig. 2, by means of the securing screw 64 extending outwardly through the non-conducting end frame 14 from an appropriate recess at the inner face of the same. The external lead-out wire 65, Fig. 1, for this R³ circuit, has its connector attached to said terminal pad 18, as seen at the upper central portion of said Fig. 1.

The stator leads 67, 68, Fig. 1, also designated as S¹ and S² in said figure and in the elementary diagram, Fig. 12, have their terminals respectively connected to terminal pads 69, 70, see also Fig. 2, affixed to the outer end face of the non-conducting end frame 14, as by the screws 71, 72 to which the ends 73, 74 of the stator winding are connected, Fig. 1, the latter being led out through an appropriate aperture 75 in the end frame. An insulating rib 76, herein formed integrally on the end frame, separates the stator terminal pads 69, 70, a similar separating rib 77 desirably being provided at a corresponding location diametrically opposite the rib 76, between the R² and R³ leads.

In the illustrated embodiment the rear end frame is finished with an annular name plate 78 set into an appropriate recess in the end frame and held in place as by the screws 80, an insulating member 81 being provided between the name plate and the frame.

Referring now more particularly to Figs. 5 to 9 inclusive, the rotor lamination assembly, including the stack of laminations 16 and the lamination retaining shell 15, preferably is produced as a structural unit in accordance with the novel method and apparatus of my invention now to be described, whereby the shell 15 is molded or cast directly upon the stack of laminations.

In the practice of this method these stator laminations 16 are stacked on an arbor 85, Figs. 6, 7 and 8, having a flange 86 and a threaded portion 87. A threaded washer 88 is screwed onto the arbor and held in position by one or more screws 89 extending through the open part of the stacked laminations and threaded into the arbor flange 86. It will be understood that the washer 88 and the retaining screws are tightened up so as to bring the group of laminations into the desired closely compacted stacked relation which they are to have in the completed unit.

Referring now to Figs. 5 and 6, a sand mold 90 is prepared by the use of a wood or other core 91, Fig. 5, constructed to conform to the shape and dimensions of the working unit as shown in Fig. 7, comprising the arbor, the laminations and holding means, and the shell member 15 which is to be cast in place on the laminations. In other words, the core is formed to provide in the mold an annular space for the formation of the shell 15 about the periphery of the laminations.

After preparation of the sand mold 90, the core 91 is removed and is replaced by the arbor 85 and the laminations secured thereon, as illustrated in Fig. 6, in which figure the annular space 15ˣ circumferentially about the laminations and which is to receive the cast shell is represented as still vacant. The metal for the shell, which may be any suitable metal adapted to be cast, such as white pattern metal, is then admitted as through the pore-hole 90ᵃ, so that it fills in the entire space 15ˣ about the laminations, the arbor flange 86 and the washer 88, between them and the sand mold. Thus it will be seen that the laminations themselves are in effect utilized as a portion of the mold.

When the metal has cooled in the mold the arbor and laminations with the shell 15 now cast thereon, as illustrated in Fig. 7, are taken out. This working unit as in Fig. 7 is then set up in a lathe, upon the centering formations 85ᵃ, 85ᵃ provided for the purpose at the opposite end faces of the arbor. The outside diameter and the ends of the cast metal shell 15 are then finished to the proper dimensions in the lathe. The arbor, washer and retaining screws are then removed, leaving the lamillar stator assembly including the now substantially integral stack of laminations 16 and their shell 15, as a single unit ready for immediate use for assembly into the appropriate motor which may be one such as previously described, or may be any motor for which such lamillar stator element is suited.

It will be understood that the described method of constructing the lamillar magnetic element of the stator, and the devices such as illustrated for practicising the method, have the advantage of simplicity, rapidity and relative inexpensiveness, particularly since they avoid a number of comparatively expensive machining operations and yet produce a superior lamillar stator unit wherein the laminations are held with great firmness. These and other advantages are obtained without sacrificing the accuracy and dimensional precision of the resulting product, a matter of major importance.

The term "motor" herein is used in the broad sense of any dynamo-electric device having stator and rotor elements, and is intended to include motors in the restricted sense of devices which transform electrical to mechanical energy and also to include other dynamo-electric devices such as generators and the so-called self-synchronous motors previously referred to, whether functioning as transmitters, generators or receivers.

It will be understood that my invention, either as to product, method or means, is not limited to the exemplary embodiment or steps herein illustrated or described, its scope being set forth in the following claims:

I claim:

1. In an electric motor and the like having a plural-phase rotor winding, in combination, a non-conducting frame supporting a stator element, a rotor shaft having non-conducting bearing portions, ball-bearing units on the frame respectively receiving said bearing portions of the rotor shaft, a magnetic element and a plurality of rotor coils on the shaft, lead-out terminals on the frame, and electrical connections between an end of one rotor coil and one ball-bearing unit, between an end of another rotor coil and a second ball-bearing unit, and between the respective ball-bearing units and the corresponding lead-out terminal, for establishing electrical circuits for said rotor coils through and by means of the ball-bearing units themselves.

2. In an electric motor and the like, a construction and arrangement comprising: a supporting end-frame of non-conducting material; a rotor element including a shaft formed of non-conducting material, a magnetic member and one or more rotor coils; a ball-bearing unit on the end-frame for rotatably supporting the shaft, including inner and outer races and an interposed series of balls; means electrically connecting one end of a rotor coil and the inner bearing race, and a lead-out connection extending from the outer bearing race, the balls of the bearing unit serving to complete said connecting circuit.

3. In an electric motor and the like, a construction and arrangement comprising a pair of opposed, spaced end-frames of non-conducting material adapted to support a stator assembly between them, one or more studs connecting the end-frames, a plural-phase rotor built up on a shaft of non-conducting material, a rotor shaft ball-bearing unit on each end-frame, rotor-coil lead-out connections associated with a given end-frame, said rotor coils having one of their ends electrically joined together, and the other ends of said coils being respectively in electrical communication with the corresponding lead-out connections at said given end-frame, a circuit for one coil being provided through the ball-bearing unit on said given end-frame and for another coil being provided through the ball-bearing unit on the opposite end-frame and thence through an end-frame connecting stud to the appropriate lead-out connection at the first, given end-frame.

4. In an electric motor and the like, a construction and arrangement comprising spaced end-frames of non-conducting material adapted to support a stator assembly, one or more studs connecting the end-frames, a three-phase rotor having a shaft of non-conducting material, a rotor shaft ball-bearing unit on each end-frame, three rotor coil lead-out connections, said rotor coils having one of their ends electrically joined together, and the other ends of said coils being respectively in electrical communication with the corresponding lead-out connections, circuits for two of the coils being provided through said ball-bearing units as elements thereof, and circuit-forming means for the third coil comprising a central button at the end face of the shaft, a conductor extending partly through the shaft and connecting the button with the coil, and a spring contact bearing centrally against the button and connecting the latter with the appropriate lead-out connection.

5. The method of making a lamillar stator unit for an electric motor and the like, which comprises, securing a plurality of laminations in aligned relation to form a working unit while leaving the peripheral portion of the unit exposed, casting a retaining shell directly upon said lamillar unit, and finishing the cast shell to the desired dimensions.

6. The method of making a lamillar stator unit for an electric motor and the like, which comprises, aligning and securing the desired plurality of laminations upon a temporary arbor, casting a retaining shell about the periphery of the group of aligned laminations while so held, rotatably supporting the working unit then comprising the arbor, laminations and shell, finishing off the shell to the desired dimensions while so rotatably supported, and removing the arbor so as to leave the laminations and shell as a structural unit ready for assembling into a motor.

SAMUEL N. MEAD.